(12) United States Patent
Sakamoto et al.

(10) Patent No.: US 11,144,565 B2
(45) Date of Patent: Oct. 12, 2021

(54) INFORMATION EXTRACTION APPARATUS, INFORMATION EXTRACTION METHOD, AND INFORMATION EXTRACTION PROGRAM

(71) Applicant: INTER-UNIVERSITY RESEARCH INSTITUTE CORPORATION RESEARCH ORGANIZATION OF INFORMATION AND SYSTEMS, Tokyo (JP)

(72) Inventors: Kazunori Sakamoto, Tokyo (JP); Shinichi Honiden, Tokyo (JP)

(73) Assignee: INTER-UNIVERSITY RESEARCH INSTITUTE CORPORATION RESEARCH ORGANIZATION OF INFORMATION AND SYSTEMS, Tokyo (JP)

( * ) Notice: Subject to any disclaimer, the term of this patent is extended or adjusted under 35 U.S.C. 154(b) by 1015 days.

(21) Appl. No.: 15/536,097

(22) PCT Filed: Dec. 14, 2015

(86) PCT No.: PCT/JP2015/084974
§ 371 (c)(1),
(2) Date: Jun. 14, 2017

(87) PCT Pub. No.: WO2016/098739
PCT Pub. Date: Jun. 23, 2016

(65) Prior Publication Data
US 2018/0018378 A1   Jan. 18, 2018

(30) Foreign Application Priority Data
Dec. 15, 2014   (JP) .............................. JP2014-253058

(51) Int. Cl.
*G06F 16/25*   (2019.01)
*G06F 16/93*   (2019.01)
(Continued)

(52) U.S. Cl.
CPC .......... *G06F 16/254* (2019.01); *G06F 16/245* (2019.01); *G06F 16/248* (2019.01);
(Continued)

(58) Field of Classification Search
CPC ............................... G06F 16/35; G06F 40/194
See application file for complete search history.

(56) References Cited

U.S. PATENT DOCUMENTS 6,092,091 A * 7/2000 Sumita .................... G06F 16/93
715/209
6,782,423 B1 * 8/2004 Nakayama ............ G06F 16/951
709/224
(Continued)

FOREIGN PATENT DOCUMENTS

EP   2648115 A1   10/2013
JP   2004-178426 A   6/2004
(Continued)

OTHER PUBLICATIONS

International Patent Application No. PCT/JP2015/084974; Int'l Search Report; dated Mar. 1, 2016; 4 pages.
(Continued)

*Primary Examiner* — James Trujillo
*Assistant Examiner* — Kurt A Mueller
(74) *Attorney, Agent, or Firm* — BakerHostetler

(57) ABSTRACT

An information extraction apparatus includes, a controller extracting, as variable elements, parts different between a plurality of structured documents and extract, as peripheral information pieces, elements within a predetermined range from the respective variable elements, and a storage unit
(Continued)

storing the variable elements and the peripheral information pieces with respect to at least an extraction object which is at least one of the variable elements. The controller re-extracts variable elements and peripheral information pieces from the plurality of structured documents, calculates similarities of the variable elements and the peripheral information pieces between before and after the re-extraction, on the basis of (i) the re-extracted variable elements and the re-extracted peripheral information pieces and (ii) the variable elements and the peripheral information pieces stored in the storage unit, and identifies, out of the re-extracted variable elements, a variable element corresponding to the extraction object, on the basis of the calculated similarities.

13 Claims, 9 Drawing Sheets

(51) Int. Cl.
G06F 16/245 (2019.01)
G06F 16/248 (2019.01)
G06F 16/955 (2019.01)
G06F 16/951 (2019.01)

(52) U.S. Cl.
CPC ............ *G06F 16/93* (2019.01); *G06F 16/951* (2019.01); *G06F 16/9566* (2019.01)

(56) References Cited

U.S. PATENT DOCUMENTS

| | | | | |
|---|---|---|---|---|
| 7,593,961 | B2* | 9/2009 | Eguchi | G06K 9/00463 |
| 7,613,602 | B2* | 11/2009 | Kanawa | G06F 40/14 |
| | | | | 704/9 |
| 7,669,119 | B1* | 2/2010 | Orelind | G06F 16/345 |
| | | | | 715/234 |
| 8,351,706 | B2* | 1/2013 | Hirohata | G06K 9/38 |
| | | | | 348/129 |
| 2001/0042083 | A1* | 11/2001 | Saito | G06K 9/00442 |
| | | | | 715/202 |
| 2003/0194689 | A1* | 10/2003 | Kamasaka | G06F 40/221 |
| | | | | 434/350 |
| 2004/0010556 | A1* | 1/2004 | Kawakita | G06F 16/313 |
| | | | | 709/206 |
| 2004/0158799 | A1* | 8/2004 | Breuel | G06F 16/84 |
| | | | | 715/212 |
| 2009/0216751 | A1* | 8/2009 | Tago | G06F 16/9566 |
| 2013/0226944 | A1 | 8/2013 | Baid et al. | |
| 2013/0311875 | A1* | 11/2013 | Pappas | G06F 40/14 |
| | | | | 715/234 |
| 2014/0297628 | A1* | 10/2014 | Tsuji | G06F 16/3346 |
| | | | | 707/723 |
| 2014/0297670 | A1 | 10/2014 | Arshad et al. | |

FOREIGN PATENT DOCUMENTS

| | | |
|---|---|---|
| JP | 2005-063332 A | 3/2005 |
| JP | 2007-293874 A | 11/2007 |
| JP | 2012-059212 A | 3/2012 |
| JP | 2012-098855 A | 5/2012 |
| JP | 2012-168892 A | 9/2012 |

OTHER PUBLICATIONS

Yandrapally et al.; "IBM Research Report—Robust Test Automation Using Contextual Clues"; Computer Science; Feb. 2014; 19 pages.

* cited by examiner

Fig.3A  http://www.....profile-A

Fig.3B
```
<div>Your body weight is
<span id="bw">55kg</span>.
Last month 54kg！<div>
<div>Your body height is
<span id="height">171cm
</span>！
</div>
<div>Name:<span>Sakamoto</span>
</div>
``` http://www.....profile-B
```
<div>Your body weight is
<span id="bw">51kg</span>.
Last month 52kg！<div>
<div>Your body height is
<span id="height">173cm
</span>！
</div>
<div>Name:<span>Sato</span>
</div>
```

Fig.3C
```
55kg
54kg
171cm
Sakamoto
```

Fig.4

| VARIABLE ELEMENT | PERIPHERAL INFORMATION PIECES | PRESENCE OR ABSENCE OF SELECTION |
|---|---|---|
| 55kg | "Your body weight is", span, id, "bw", /span, "." | ○ (EXTRACTION OBJECT) |
| 54kg | "Last month", "!" | × |
| 171cm | span, id, "height", /span, "!" | × |
| Sakamoto | div, "Name:", span, /span, /div | × |

```
<div>Your body weight is
  <span id="bw">55kg</span>.
  Last month 54kg ! <div>
<div>Your body height is
  <span id="height">171cm
  </span>!
</div>
<div>Name:<span>Sakamoto</span>
</div>
```

AFTER SPECIFICATION CHANGE

```
<div>Name:<span id="name">
  Sakamoto</span></div>
<div>Body Weight:<span id="bw">
  56kg</span></div>
<div>Last month's body weight:<span id="lbw">
  55kg</span></div>
<div>Body Height:<span id="height">
  171cm</span></div>
```

Fig.7

| STORED \ RE-EXTRACTED | Sakamoto | 56kg | 55kg | 171cm |
|---|---|---|---|---|
| 55kg | 0.1 | 0.4 | 0.3 | 0.2 |
| 54kg | 0.2 | 0.3 | 0.2 | 0.2 |
| 171cm | 0.2 | 0.2 | 0.2 | 0.4 |
| Sakamoto | 0.5 | 0.1 | 0.1 | 0.1 |

Fig. 8

```
<div>Current time is 11:59 </div>
<div>Your body weight is 55kg!
 Last month: 54kg</div>
<div>Your body height is
  <span id="height">171cm
  </span>!
</div>
<div>Name:<span>Sakamoto</span>
</div>
```

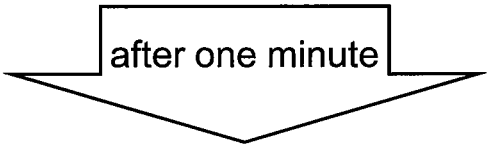
after one minute

```
<div>Current time is 12:00 </div>
<div>Your body weight is 55kg!
 Last month: 54kg</div>
<div>Your body height is
  <span id="height">171cm
  </span>!
</div>
<div>Name:<span>Sakamoto</span>
</div>
```

INFORMATION EXTRACTION APPARATUS, INFORMATION EXTRACTION METHOD, AND INFORMATION EXTRACTION PROGRAM

CROSS-REFERENCE TO RELATED APPLICATIONS

This is a national stage application in the United States based on International Application No. PCT/JP2015/084974, filed on Dec. 14, 2015, which claims priority to Japanese Patent Application No. 2014-253058, filed on Dec. 15, 2014, the disclosures of which are incorporated herein by reference in their entireties.

TECHNICAL FIELD

The present disclosure relates to an information extraction apparatus, an information extraction method, and an information extraction program for extracting specific information from structured documents.

BACKGROUND ART

A conventional information extraction apparatus (see Patent Document 1) detects the difference between Web pages having the same configuration, identifies as a differential area a place (tag) at which the difference is detected, extracts as a difference data the information written in the differential area, and stores as specific information the differential area and the difference data in association with each other. For example, a tag of "postal code" and an actual postal code (for example, 100-1000) are stored as being associated with each other. With this information extraction apparatus, for example, by calculating the difference between the Web pages of Mr. or Mrs. "A" and Mr. or Mrs. "B" for English learning records, it is possible to extract as personal information the parts (a user name, vocabulary learning hours, grammar learning hours, and the like) which have different contents between users.

Further, another information extraction apparatus (see Patent Document 2) automatically creates an extraction rule for extracting data from the part which is common to tree structures of a plurality of Web pages, and automatically creates an identification rule for identifying a URL of a Web page to which the extraction rule applies. This information extraction apparatus stores the created identification rules and extraction rules in association with each other, where the identification rules are for identifying a URL of the created Web page, and the extraction rules are for extracting data from a Web page. At the time of extracting data (specific information) from an extraction target Web page, the information extraction apparatus selects the identification rule for identifying the URL of the extraction target Web page, selects the extraction rule associated with the selected identification rule, and extracts data (specific information) from the extraction target Web page on the basis of the selected extraction rule.

Still another information extraction apparatus (see Patent Document 3) achieves a function which identifies and extracts, from a single Web page (a bulletin board or the like) in which a plurality of personal areas coexist, parts corresponding to the personal area and which identifies the information associated with the personal areas. For example, in a page of a bulletin board, the parts written by users are identified, and the written contents are extracted for each user.

Still another information extraction apparatus (see Non-Patent Document 1) achieves a method about a description of a rule. By the method, when a specification has been changed in a function test of a web application, a specific element is extracted by referring to peripheral information, which is called "contextual clues", without modifying an extraction program for a specific element as an extraction object. For example, at the time of extracting "vocabulary learning hours" and "grammar learning hours" from a Web page for English learning records, the following rule is used: the "'vocabulary learning hours' is in the vicinity of the wording of 'vocabulary'", and the "'grammar learning hours' is in the vicinity of the wording of 'grammar'", and the specific information is extracted continuously and robustly.

PRIOR ART DOCUMENTS

Patent Documents

Patent Document 1: JP 2012-098855 A
Patent Document 2: JP 2012-059212 A
Patent Document 3: JP 2012-168892 A

Non-Patent Documents

Non-Patent Document 1: Rahulkrishna Yandrapally, Suresh Thummalapenta, Saurabh Sinha, Satish Chandra, "Robust Test Automation Using Contextual Clues", IBM Research Report, 2014.

SUMMARY OF INVENTION

Problem to be Solved by the Invention

Generally, a specification of a Web page (for example, a page design, an arrangement of information, and a tree structure of a page) is frequently changed in some cases. However, as will be described later, when a specification of a structured document (for example, a Web page) has been changed, the above-described conventional information extraction apparatuses cannot easily and reliably extract, after the specification has changed, the specific information (for example, personal information) extracted before the specification change.

The information extraction apparatus of Patent Document 1 does not track the extraction information before and after the specification change. Therefore, for example, even if the vocabulary learning hours and the grammar learning hours can be extracted from a Web page for English learning records at a certain point of time, it is sometimes impossible to identify whether the information extracted after the specification change is the vocabulary learning hours or the grammar learning hours.

The information extraction apparatus of Patent Document 2 manually or automatically regenerates the extraction rule and the identification rule when the change in structure of a Web page is detected. That is, in the case of Patent Document 2, if the specification of a Web page has been changed, the extraction rule and the identification rule need to be created again. Further, the information extracted in Patent Document 2 is limited to the part which is common to a plurality of Web pages.

The information extraction apparatus of Patent Document 3 does not track the extraction information before and after the design or the configuration of a Web page has been changed.

In the information extraction apparatus of Non-Patent Document 1, it is necessary for a user to select the peripheral information to be used to extract an element as an extraction object. Further, because the peripheral information is limited to specific information (for example, information in the vicinity of the wording "grammar"), if such peripheral information has disappeared due to a specification change of the Web page, the element of the extraction object cannot be extracted.

As described above, in the case that the specification of a structured document (for example, a Web page) has been changed, the conventional information extraction apparatuses cannot easily or reliably extract, after the specification has been changed, the specific information extracted before the specification change.

An object of the present disclosure is to provide an information extraction apparatus, an information extraction method, and an information extraction program which can extract, even if the specification of a structured document (for example, a Web page) has been changed, the specific information extracted before the change of specification, also after the specification has been changed.

Means for Solving the Problem

An information extraction apparatus of the present disclosure includes: a controller configured to acquire a plurality of structured documents (specifically, a plurality of documents having the same structure but having different contexts) and extract, as variable elements, parts different between the acquired documents and extract, as peripheral information pieces, elements within a predetermined range from the respective variable elements; and a storage unit configured to store the variable elements and the peripheral information pieces with respect to at least an extraction object which is at least one of the variable elements. The controller re-acquires the plurality of structured documents and re-extracts, as variable elements, parts different between the re-acquired documents and re-extracts, as peripheral information pieces, elements within the predetermined range from the respective re-extracted variable elements. The controller calculates similarities of the variable elements and the peripheral information pieces between before and after the re-extraction, on the basis of (i) the re-extracted variable elements and the re-extracted peripheral information pieces and (ii) the variable elements and the peripheral information pieces stored in the storage unit. The controller identifies, out of the re-extracted variable elements, a variable element corresponding to the extraction object, on the basis of the calculated similarities.

An information extraction method of the present disclosure includes the steps of: acquiring a plurality of structured documents; extracting, as variable elements, parts different between the acquired documents; extracting, as peripheral information pieces, elements within a predetermined range from the respective variable elements; and storing in a storage unit the variable element and the peripheral information pieces with respect to at least an extraction object which is at least one of the variable elements; re-acquiring the plurality of structured documents; re-extracting, as variable elements, parts different between the re-acquired documents; re-extracting, as peripheral information pieces, elements within the predetermined range from the respective re-extracted variable elements; calculating similarities of the variable elements and the peripheral information pieces between before and after the re-extraction, on the basis of (i) the re-extracted variable elements and the re-extracted peripheral information pieces and (ii) the variable elements and the peripheral information pieces stored in the storage unit, and identifying, out of the re-extracted variable elements, a variable element corresponding to the extraction object, on the basis of the calculated similarities.

An information extraction program of the present disclosure makes a computer execute the steps of the above information extraction method.

Effects of the Invention

An information extraction apparatus of the present disclosure extracts, as variable elements, parts (for example, personal information such as a name, a body weight, and a body height) different between a plurality of structured documents, and in addition, extracts, as peripheral information pieces, elements (for example, text, an HTML tag, and an attribute) within a predetermined range from the respective variable elements, and stores the variable elements and the peripheral information pieces with respect to at least an extraction object (specific information) which is at least one of the variable elements. The information extraction apparatus of the present disclosure calculates, when having re-extracted variable elements and peripheral information pieces of the variable elements, the similarities between (i) the stored variable elements and the stored peripheral information pieces and (ii) the re-extracted variable elements and the re-extracted peripheral information pieces, and identifies, out of the re-extracted variable elements, a variable element corresponding to the extraction object on the basis of calculation result. With this arrangement, even when a specification of a structured document (for example, a Web page) has been changed, specific information extracted before the specification change is easily and reliably extracted or tracked also after the specification change.

BRIEF DESCRIPTION OF DRAWINGS

FIGS. 3A, 3B and 3C are diagrams each showing a specific example of a Web page in the first embodiment of the present disclosure, FIG. 3A shows URLs, FIG. 3B shows HTML documents, and FIG. 3C shows a screen display of variable elements.

FIG. 4 is an example of extraction information stored in a memory in the first embodiment of the present disclosure.

FIG. 6 is an example of a Web page before and after a specification change in the first embodiment of the present disclosure.

FIG. 7 is an example of similarities in the first embodiment of the present disclosure.

FIG. 8 is an example of a Web page of a subject person before and after one minute has passed in a second embodiment in the present disclosure.

DESCRIPTION OF EMBODIMENTS

Herein after, embodiments of the present disclosure will be described with reference to the drawings.

First Embodiment

An information extraction apparatus of the present embodiment extracts, as variable elements, parts different between a plurality of structured documents (Web pages in the present embodiment), extracts, as peripheral information pieces, elements within a predetermined range from the respective variable elements, and stores the variable elements and the peripheral information pieces with respect to at least an extraction object (specific information) which is at least one of the variable elements. The information extraction apparatus calculates, when having re-extracted variable elements and peripheral information pieces of the variable elements, similarities between (i) the stored variable element and the stored peripheral information pieces and (ii) the re-extracted variable elements and the re-extracted peripheral information pieces, and identifies, out of the re-extracted variable elements, a variable element corresponding to the extraction object on the basis of calculation result. With this arrangement, even when a specification of a structured document has been changed, specific information extracted before the specification change is easily and reliably extracted also after the specification change, in other words, the specific information can be tracked before and after the specification change. With the present embodiment, by tracking the position of the extraction part before and after the specification change, the specific information can be extracted mechanically and constantly. Hereinafter, a description will be given exemplifying the case in which the structured document is a Web page.

1-1. Configuration of Information Extraction Apparatus

Figure 1:
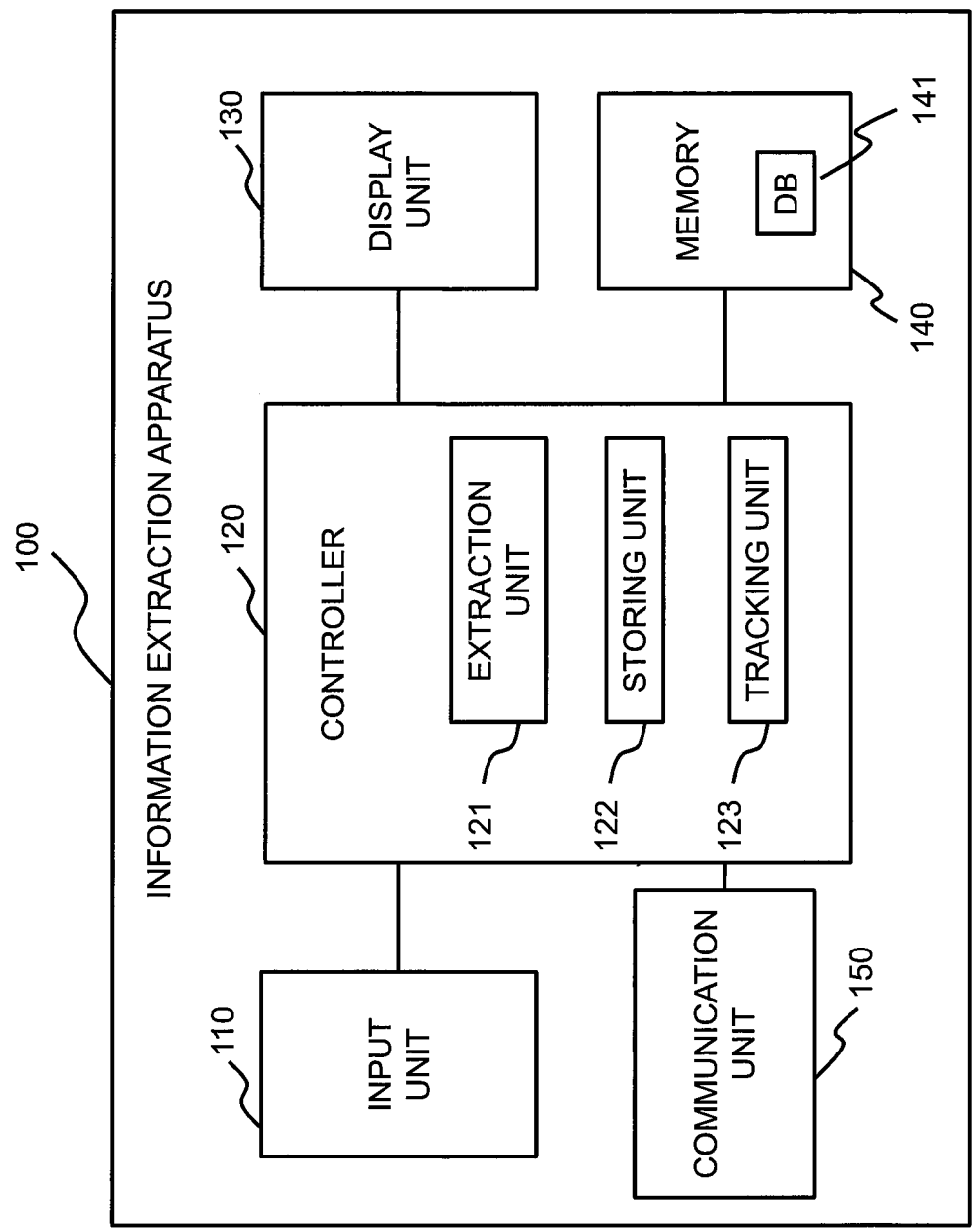
FIG. 1 is a configuration diagram of an information extraction apparatus of a first embodiment of the present disclosure.

FIG. 1 shows a configuration of the information extraction apparatus of an embodiment of the present disclosure. An information extraction apparatus 100 can be realized by a personal computer and the like. The information extraction apparatus 100 has an input unit 110 which accepts an input from a user, a controller 120 which totally controls information extraction apparatus 100, a display unit 130, a memory 140, and a communication unit 150.

The input unit 110 is used to input, for example, information indicating a place at which a structured document is located (in the present embodiment, the URL of a Web page). The input unit 110 is also used to select at least one of the variable elements which are parts different between a plurality of Web pages, as specific information (extraction element) which functions as the extraction object. The input unit 110 is, for example, a keyboard or a touch panel.

The controller 120 has: an extraction unit 121 which extracts variable elements which are parts different between a plurality of Web pages, and peripheral information pieces of the variable elements; the storing unit 122 which writes in the memory 140 the extracted variable elements and the extracted peripheral information pieces; and a tracking unit 123 which tracks the extraction elements by using the variable elements and the peripheral information pieces written in the memory 140.

The extraction unit 121 acquires the configuration information (an HTML (Hyper Text Markup Language) document, in the present embodiment) of each of a plurality of Web pages including a target Web page, on the basis of the corresponding URL, and extracts, as variable elements, parts different between the Web pages on the basis of the acquired configuration information. In the present embodiment, the variable elements are extracted by calculating the differences between the Web pages. The variable elements correspond to, for example, personal information (name, body weight, body height, and the like). Further, from the target page, the extraction unit 121 extracts, as peripheral information pieces, the elements (text, an HTML tag, an attribute, and the like) within a predetermined range from every variable element in the target page.

The display unit 130 displays the variable elements extracted by the extraction unit 121. The display unit 130 can be realized by a display and the like. A user selects, out of the variable elements displayed on the display unit 130, an element desired to be extracted, and inputs the selected element in the input unit 110.

The storing unit 122 stores extraction information shown in FIG. 4 in a data base (DB) 141 in the memory 140. The extraction information includes all of the variable elements in the target page and the peripheral information pieces of the variable elements, and in addition, includes the indication of presence or absence of the selection, made by the user, as an extraction object. Further, a storing unit 122 stores the URL having been input in the memory 140. The memory 140 is a hard disk, for example. Note that the memory 140 does not have to be a hard disk and may be a storage device such as an optical disk, a semiconductor memory element such as a flash memory, or a RAM.

The tracking unit 123 tracks the variable element (specific information) selected as the extraction object. Specifically, the tracking unit 123 restores the correspondence relation between the variable elements before the re-extraction and the variable elements after the re-extraction by using (i) the variable elements and the peripheral information pieces of the current Web page re-extracted by the extraction unit 121, and (ii) the extraction information in the data base 141. In the present embodiment, the correspondence relation is restored by calculating the similarities between the information about the newly extracted variable elements and the information about the variable elements stored in the data base 141 and by associating the variable elements having high similarities with each other. More specifically, the calculation of the similarities is performed by comprehensively determining the similarities of the variable elements themselves and the similarities of the peripheral information pieces. By this process, out of the variable elements after the re-extraction, the element previously designated by the user as the extraction object is identified.

The communication unit 150 is connected to a network such as the Internet. The extraction unit 121 acquires the HTML document corresponding to a URL through the communication unit 150. Further, the extraction element may be selected by the user through the communication unit 150. Further, the tracked extraction element may be output through the communication unit 150 to an external device.

1-2. Operation of Information Extraction Apparatus

Figure 2:
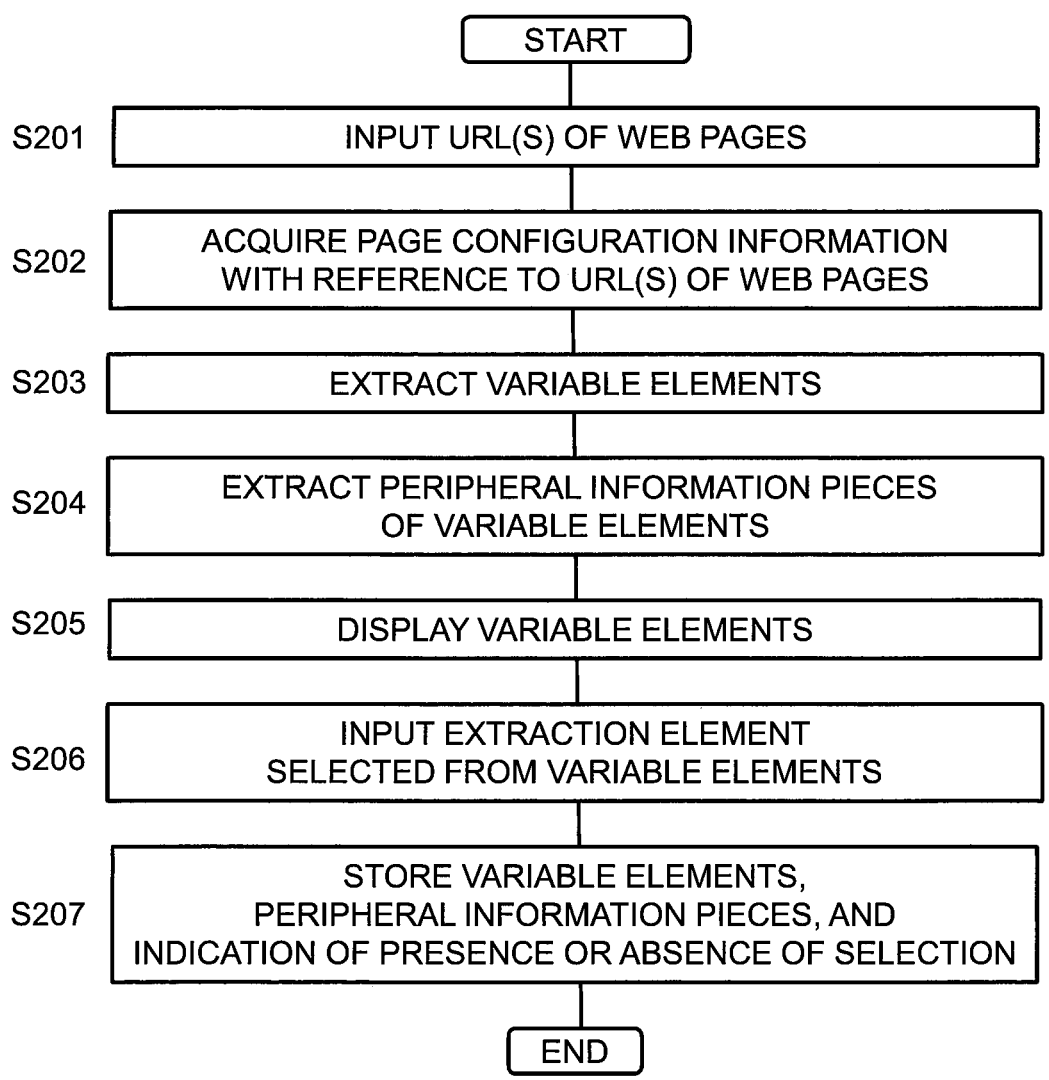
FIG. 2 is a flowchart illustrating how to extract variable elements and peripheral information pieces in the first embodiment of the present disclosure.

FIG. 2 shows a flowchart for extracting variable elements and peripheral information pieces by the information extraction apparatus 100. FIG. 3A, FIG. 3B, and FIG. 3C show examples of URLs, HTML documents, and a screen display of the variable elements after extraction, respectively. The left-side part of FIG. 3B is a Web page which is an extraction target in the present embodiment, and the right-side part is a Web page which has the different context (an account, time and date, and the like) from the context of the extraction target Web page. In the example of FIG. 3B, the HTML document includes, for each user, four types of information composed of a name, a current body weight, a body weight in the previous month, and a body height. FIG. 4 shows an example of the DB 141 for the extraction information stored in the memory 140.

Hereinafter, as shown in FIG. 4, a description will be given exemplifying the case in which "55 kg" (which is this month's body weight of Mr. Sakamoto) will be selected as the extraction object.

In the flowchart of FIG. 2, the input unit 110 first inputs URLs of a plurality of Web pages as shown in FIG. 3A (step S201). Specifically, the input URLs includes the URL of an extraction target Web page and the URLs of other one or more Web pages which have the same layouts and structures as those of the extraction target Web page and have different context from that of the extraction target Web page. The storing unit 122 stores in the memory 140 the URLs having been input. The extraction unit 121 acquires the configuration information (HTML documents) of the Web pages corresponding to the URLs through the communication unit 150 (step S202).

The extraction unit 121 extracts, as variable elements, parts which are included in the extraction target Web page and are different from the other one or more Web pages, on the basis of the acquired configuration information (step S203). For example, from the Web page shown in FIG. 3B on which personal information is posted, the personal information ("55 kg", "54 kg", "171 cm", "Sakamoto") which is different for each user is extracted as variable elements. In the present embodiment, the variable elements are extracted by calculating the differences between the extraction target Web page and the other Web pages. The difference calculation may be performed by using, for example, an existing algorithm (XDiff: Wang, Yuan, David J. DeWitt, and J-Y. Cai. "X-Diff: An effective change detection algorithm for XML documents." IEEE 19th International Conference on Data Engineering, pp. 519-530, 2003). Note that the difference calculation is not limited to this algorithm. In the case that the personal information happens to have the same content (for example, in the case that Sakamoto and Sato have the same body weight or the same body height), the personal information cannot be extracted as a variable element. To address this issue, a plurality of other Web pages are prepared for comparison with the extraction target Web page, and it is possible to sufficiently reduce the possibility that the Web pages happen to have the same information, and whereby the variable elements can be extracted more accurately.

The extraction unit 121 extracts peripheral information pieces, which are the elements within a predetermined range from the variable elements (for example, within 100 characters before and after the variable elements), out of the configuration information (HTML documents) of the Web pages (step S204). Specifically, as the peripheral information pieces, a token string is extracted. The token string includes an HTML tag name, an attribute name, an attribute value, and text. As shown in FIG. 3B and FIG. 4, with respect to the variable element "55 kg", for example, the text ("Your body weight is", "."), the HTML tag (div, span), the attribute name (id), and the attribute value ("height") are extracted (for example, "Your body weight is", span, id, "bw", /span, ".").

The extraction unit 121 displays the extracted variable elements on the display unit 130 as shown in FIG. 3C (step S205). This display enables a user to visually recognize the variable elements in the target Web page and select an extraction object (an element desired to be tracked) out of the variable elements. For example, the user may select, as the information to be constantly extracted, "55 kg" (a current body weight) from the variable elements shown in FIG. 3C. The input unit 110 inputs the selection (step S206). As shown in FIG. 4, the storing unit 122 stores, in the data base 141 in the memory 140, the extraction information including (i) all of the variable elements in the extraction target Web page and the peripheral information pieces of the variable elements and (ii) the indication of presence or absence of the selection of the extraction object obtained through the input unit 110 (step S207).

As described above, storing of the information necessary to track the specific information (extraction element) selected as the extraction object is completed. The extraction element is tracked by using the extraction information stored in the data base 141. This enables tracking of the extraction element even if the design or the configuration is changed due to a specification change of a Web page.

Figure 5:
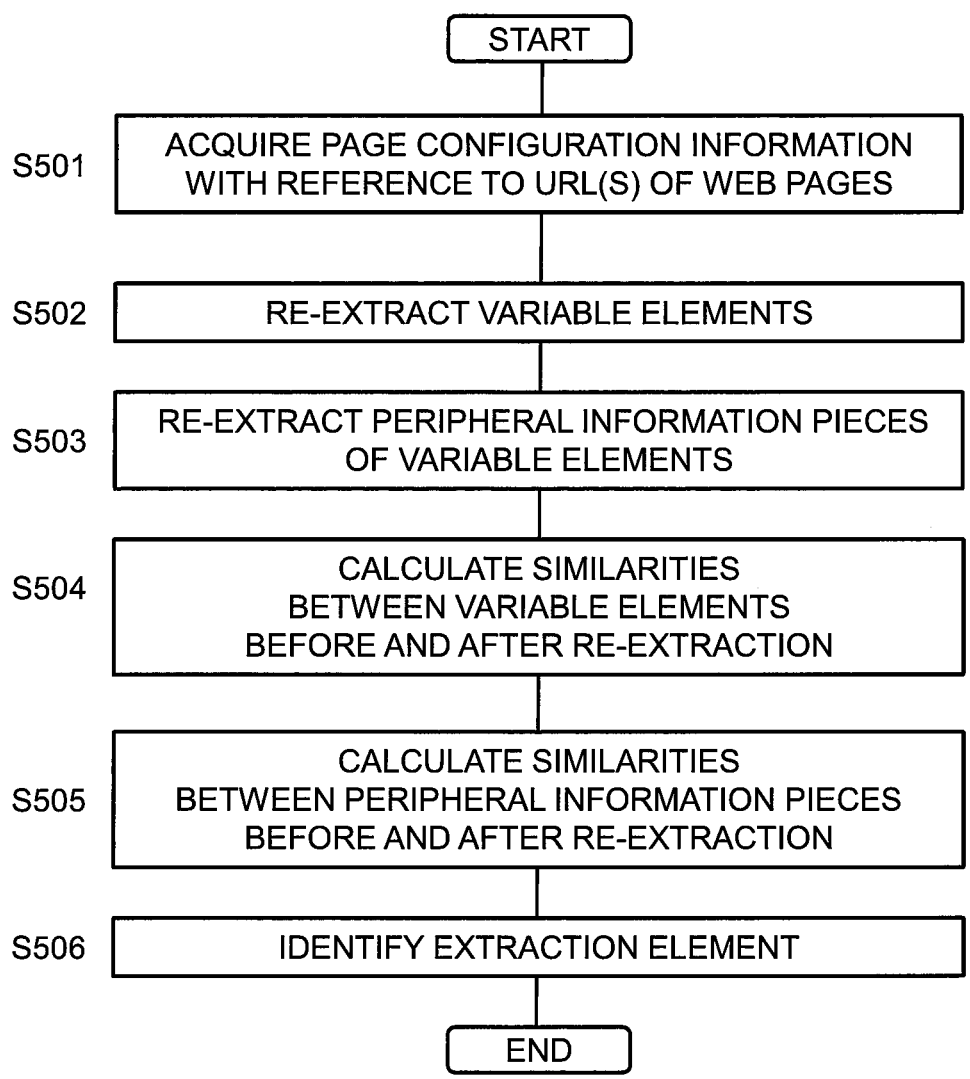
FIG. 5 is a flowchart illustrating how to extract specific information in the first embodiment of the present disclosure.

FIG. 5 shows a flowchart for tracking specific information (extraction element) by the information extraction apparatus 100. FIG. 6 shows an example of an HTML document before and after a specification change of a Web page. FIG. 7 shows the similarities between the stored variable elements and the re-extracted variable elements.

With reference to FIG. 5, the information extraction apparatus 100 tracks the specific information (extraction element) on a predetermined cycle (for example, once in a month) or by a user's designation. At the time of tracking the specific information (extraction element), the extraction unit 121 of the information extraction apparatus 100 first acquires again the configuration information (HTML document) of a plurality of Web page, in the same way as steps S202 and S203 of FIG. 2, by using the URL stored in the memory 140 (step S501), and extracts the variable elements of the current Web page (step S502). For example, it is assumed as shown in FIG. 6 that the specification of the Web page has been changed, one month has passed, and the body weight has increased by 1 kg. In this case, as the variable elements of the target Web page, "Sakamoto", "56 kg", "55 kg", and "171 cm" are extracted. After that, the extraction unit 121 re-extracts the peripheral information pieces of the variable elements in the same way as step S204 of FIG. 2 (step S503). Specifically, a token string configured with an HTML tag name, an attribute name, an attribute value, and a text are extracted in the range of 100 characters before and after the variable elements (for example, div, "Body Weight:", span, id, "bw", /span, /div).

The tracking unit 123 calculates similarities between the variable elements by using the re-extracted variable elements and the variable elements stored in the data base 141 (step S504). Further, the tracking unit 123 calculates similarities between the peripheral information pieces by using the re-extracted peripheral information pieces and the peripheral information pieces stored in the data base 141 (step S505). By comprehensively considering the calculated similarities of the variable elements and the calculated similarities of the peripheral information pieces, it is assumed that the combination having the highest similarity corresponds to the same variable element. Thus, the correspondence relations of the variable elements are restored by associating the variable elements having high similarities with each other. By this process, the extraction element is identified (step S506). That is, the specific information which is the extraction object can be tracked.

Any calculation method can be used as the calculation method for the similarities of the variable elements and the peripheral information pieces (structured character string in the periphery). For example, in the calculation of the similarities of the variable elements and the similarities of the peripheral information pieces, a Levenshtein distance can be used. In the present embodiment, the similarities are calculated by using a real number normalized to be not less than 0 and not more than 1.0. Specifically, the similarity is defined as follows.

Similarity={similarity (S1) of variable elements}×(coefficient A)+{similarity (S2) of peripheral information pieces}×(coefficient B), where the coefficient A and the coefficient B are each a real number not less than 0, and coefficient A+coefficient B=1.0.

The coefficient A and the coefficient B are parameters, and it is possible to adjust the accuracy of the similarity calculation, depending on an application target by varying the values of the coefficients.

"A similarity of variable element (S1=0.0 to 1.0)" is defined as follows.

Similarity (S1) of variable element={similarity (S3) of numeral part}×(coefficient C)+{similarity (S4) of character part}×(coefficient D), where, the coefficient C and the coefficient D are each a value not less than 0, and coefficient C+coefficient D=1.0.

Therefore, regarding the similarities of variable elements, the text of a variable element is separated into a numeral part and a character part. For example, "55 kg" is separated into "55" and "kg", "56 kg" is separated into "56" and "kg", and "171 cm" is separated into "171" and "kg".

Next, the similarities of the numeral parts and the character parts in the variable elements are calculated as follows. Regarding the similarities (S3) of the numeral parts of the variable elements, the re-extracted variable elements are first arranged in the ascending order with respect to the absolute value of the differences in the numeral parts between the re-extracted variable elements and the extraction element (for example, |55−55|, |56−55|, and |171−55|), so that the order of the re-extracted variable elements is determined. If the numeral part is not present, the absolute value of the difference is set to infinite. Then, the similarities of the numeral parts are calculated by the formula: similarity={(a number of types of an absolute value of a difference)−order}×1/{(a number of types of an absolute value of a difference)−1}. For example, the similarities (S3) of the numeral parts of the re-extracted variable elements with respect to the numeral part "55" of the extraction element "55 kg" on the upper part of FIG. 6 are as follows.

| Re-extracted variable element | 55 kg (First) | 56 kg (Second) | 171 cm (Third) | Sakamoto (Fourth) |
|---|---|---|---|---|
| Absolute value of difference | 0 | 1 | 116 | ∞ |
| Number of types of absolute value of difference | | | 4 | |
| Similarity to stored variable element | 1.0 | 0.66 | 0.33 | 0 |

Regarding the similarities (S4) of the character parts (character string) of the variable elements, a length of longest common subsequence (LCS) is used with respect to the character string of the variable element. The similarities (S4) of the character parts are calculated by the formula: (a similarity of character parts)=(a length of LCS)/(a character string length before a specification change). For example, the similarities (S4) of the character parts of the re-extracted variable elements with respect to the character part "kg" of the extraction element "55 kg" are as follows.

| Re-extracted variable element | 55 kg | 56 kg | 171 cm | Sakamoto |
|---|---|---|---|---|
| Length of LCS | 2 | 2 | 0 | 0 |
| Character string length before specification change | | | 2 | |
| Similarity to stored variable element | 1.0 | 1.0 | 0 | 0 |

As described above, the similarities of the whole variable elements are calculated from the similarities of each of the numeral parts and the character parts of the variable elements. Next, the similarities (S2) of the peripheral information pieces (which are the similarities between the peripheral character strings) are calculated. For example, the similarity of the peripheral information pieces corresponding to the peripheral structured character string "Your body weight is<span id='bw'>55 kg</span>. Last month 54 kg!" is calculated.

First, a token string is created, focusing on the structure of the HTML document. For example, the variable elements are removed, and a string is created by considering each of the HTML tag name, the attribute name, the attribute value, and the text as one token ("'div', 'Name:', 'span', 'id', 'name', '/span', '/div'" is created from "<div>Name:<span id='name'>Sakamoto</span></div>"). Next, the X (X is an arbitrary number) number of tokens before and after the variable part are extracted as a peripheral character string (in the case of extracting previous and next two tokens (X=2), "'id', 'name', '/span', '/div'" are extracted from "<div>Name:<span id='name'>Sakamoto</span></div>". In the case of extracting previous and next two tokens (X=2), "'id', 'bw', '/span', '. Last month 54 kg!'" are extracted from "<div>Your body weight is<span id='low'>55 kg</span>. Last month 54 kg!</div>"). After that, a morphological analysis is performed on the respective tokens after the extraction to convert the tokens into word strings ("'id', 'name', '/span', '/div'" does not change, and "'id', 'bw', '/span', '. Last month 54 kg!'" is converted into "'id', 'bw', '/span', '.', 'Last', 'month', '54 kg', '!'").

For example, in the case that the previous and next two tokens are extracted, the word strings are obtained as follows.

The word string of the peripheral information pieces of "55 kg" before the specification change is "'id', 'bw', '/span', '.', 'Last', 'month', '54 kg', '!'".

The word strings after the specification change are as follows.

(1) The peripheral information pieces of "Sakamoto": "'id', 'name', '/span', '/div'";

(2) The peripheral information pieces of "56 kg": "'id', 'bw', '/span', '/div'";

(3) The peripheral information pieces of "55 kg": "'id', 'lbw', '/span', '/div'"; and (4) The peripheral information pieces of "171 cm": "'id', 'height', '/span', '/div'".

The obtained word strings are compared with one another to calculate similarities. Specifically, a similarity (S2) of peripheral information pieces is calculated by the formula: (a similarity of peripheral information pieces)=(a number of common words between before and after a specification change)/{(a number of words before a specification change)+(a number of words after a specification change)}.

In the above example, the number of words before a specification change is 8, and the number of words after a specification change is 4. The number of common words between before and after the specification change is counted by counting up a number of common words included in the respective word string both before and after the specification change (for example, in the case of the peripheral information pieces of 55 kg" before the specification change and (1) the peripheral information pieces of "Sakamoto" after the specification change, because "id" and "/span" are included in both word strings before and after a specification change, the number is 4 because of "id"×2 and "/span"×2).

The calculated similarities (S2) of the peripheral information pieces are as follows.

| Re-extracted peripheral information piece | (1) Sakamoto | (2) 56 kg | (3) 55 kg | (4) 171 cm |
|---|---|---|---|---|
| Number of common words | 4 | 6 | 4 | 4 |
| Similarity | 0.333 | 0.5 | 0.333 | 0.333 |

From the calculated similarities (S4) of the character parts and the similarities (S3) of the numeral parts of the variable elements, and the calculated similarities (S2) of the peripheral information pieces, the final similarities with respect to "55 kg" which is the extraction element (in this example, the current body weight) before the specification change are calculated by the formula: "similarity={(S3×C+S4×D)×A+S2×B)}" as shown below, where the values of the coefficients A, B, C, and D are set as A=0.2, B=0.8, C=0.5, and D=0.5, respectively.

| | Re-extracted | | | |
|---|---|---|---|---|
| Stored | Sakamoto | 56 kg | 55 kg | 171 cm |
| 55 kg (Current body weight) | 0.2664 | 0.566 | 0.4664 | 0.2994 |

Further, FIG. 7 shows the similarity of each pair of variable elements between before and after the specification change of the Web page, where the similarities are calculated by the formula "similarity=(S3×C+S4×D)×A+S2×B)". Note that although the values in FIG. 7 are different from the above example, the numerical values are assumed to have been obtained by the result of the calculation of the above method. In the uppermost row of "(stored) 55 kg" of FIG. 7, "56 kg" in the re-extracted variable elements has a similarity of 0.4, which is the highest with respect to the extraction element "55 kg". Therefore, it is considered that the re-extracted "56 kg" has a correspondence relation to "55 kg" stored as the extraction object. That is, the re-extracted "56 kg" is identified as the extraction element.

Note that the stored "54 kg" also has a similarity of 0.3, which is highest with respect to "56 kg" among re-extracted variable elements. However, while the pair of "55 kg (stored)" and "56 kg (re-extracted)" has a similarity of 0.4, the pair of "54 kg (stored)" and "56 kg (re-extracted)" has a similarity of 0.3. Therefore, the correspondence relation of the pair of "55 kg (stored)" and "56 kg (re-extracted)" is restored by considering that the pair of "55 kg (stored)" and "56 kg (re-extracted)" has a higher similarity. Further, with reference to FIG. 7, "Sakamoto" and "171 cm" have no change in the text of the variable elements themselves before and after the specification change. Therefore, "Sakamoto" has a high similarity of 0.5 between before and after the re-extraction, and "171 cm" also has a high similarity of 0.4 between before and after the re-extraction. As described above, in the case that the variable element does not change itself, a pair having a high similarity can be easily found. The restoration of the correspondence relation is determined in order from the pair having a high numerical value of the similarity (0.5 (Sakamoto-Sakamoto), 0.4 (56 kg-55 kg), 0.4 (171 cm-171 cm), and 0.2 (55 kg-54 kg)). Therefore, "55 kg (re-extracted)" is paired with "54 kg (stored)". FIG. 7 shows an example in which pairs of all of the elements are established. However, if there is an element which is not in pair (for example, in the case that "sex (male)" is included after the specification change), it is determined that there is no correspondence relation.

Note that in order to describe the calculation of a similarity, FIG. 7 shows the correspondence relations between all of the variable elements (which includes the variable elements other than the extraction element) in the target page and the re-extracted variable elements. However, in the calculations of the similarities to identify the extraction element (steps S504 and S505), the similarity may be calculated with respect to at least the variable element selected as the extraction object (for example, only the uppermost row of "(stored) 55 kg" of FIG. 7).

As described above, by calculating the similarities of the respective re-extracted variable elements with respect to the extraction element (specific information) selected by a user and by restoring the correspondence relation between the variable elements before and after the re-extraction, the specific information of the extraction object can be mechanically and constantly extracted.

1-3. Conclusion

As described above, the information extraction apparatus 100 extracts the specific information as the extraction object from the newly acquired configuration information of the target Web page, on the basis of the stored extraction information (the variable elements, the peripheral information pieces, and the indication of presence or absence of the selection as the extraction object). The Web pages are frequently changed in specifications such as design and structure, and the specification is changed as in FIG. 6, for example, in some cases. However, according to the present disclosure, the specific information is extracted by using the variable elements and the peripheral information pieces of the variable elements. Therefore, even if the configuration information of a Web page is changed, it is possible to automatically extract (track) the specific information designated by a user. Further, there is a case in which the specific information designated by a user itself changes. For example, as shown in FIG. 6, the numerical value (the numerical value of the body weight in this month) of the specific information may have been updated. However, the stored extraction information is used to extract the specific information according to the present disclosure. Thus, even if the specific information itself has been changed, it is possible to automatically extract (track) the specific information designated by a user.

Because the information extraction apparatus 100 of the present embodiment makes it possible to automatically extract (track) the specific information, the information extraction apparatus 100 can be used for various services. For example, the information extraction apparatus 100 may also be used for a goal achievement supporting system in which achievement of a goal set by a user is supported by using the specific information extracted by the information extraction apparatus 100 and in which a reward is given to or a penalty is imposed on the user, depending on the result of the goal achievement. As described above, the information extraction apparatus 100 of the present embodiment can automatically collect personal information even if the configuration of a Web page or the personal information is changed. Therefore, the information extraction apparatus 100 of the present embodiment is useful for a service using the extracted personal information.

In recent years, due to the development of web applications and wearable devices, Web services (life log services) are widely used to record and provide daily activities and fluctuating personal information such as a body weight. Such Web services have different features, and a user uses a plurality of Web services. However, when a plurality of Web services are used, cost for collecting and processing information from the Web services increases. In order to solve the issue that the cost of collection increases in proportion to the number of used services, there is a need for a system which extracts information from various life log services and collectively manages personal information. When the information extraction apparatus 100 of the present disclosure is used, it is possible to extract information by analyzing a Web page, for each user, constituting existing life log services. Because daily activities are recorded in the life log, information as an extraction object is updated frequently. Therefore, at the time of extracting information from Web page on a regular basis, if the design or the configuration of a Web page has been changed in association with the specification change of a life log service, a mechanism for extracting information does not function in the conventional information extraction apparatus. However, the information extraction apparatus 100 of the present disclosure makes it possible to continue to mechanically and constantly extract the specific information from the Web page even when the design or the configuration of the Web page has been changed. Therefore, it is possible to achieve a system to collect personal information from a plurality of life log services or the like and to collectively manage the collected information and the previously collected history. As a result, the cost of collecting and managing information can be reduced. If the collected information deals with numerical values such as the number of pages of book reading or a study time of English, the numerical values can be visualized by creating a graph or the like. Further, a system can also be built in which if the value largely fluctuates, compared to the past, a motivational feedback is provided.

The information which changes depending on a context is more likely to be personal information. Therefore, the present disclosure is useful to collect personal information on a regular basis. Further, the present disclosure is useful for Web applications having a plurality of Web pages. The present disclosure effectively functions in the software industry and mostly in an industry using such software to analyze information sources on the Web.

1-4. Modified Example

In the present embodiment, the calculation of the similarities (S2) of peripheral information pieces is performed by creating a token string including no variable element. However, the token string including a variable element may be created (for example, a token string "div', 'Name:', 'span', 'id', 'name', 'Sakamoto', '/span', '/div'" is created from "<div>Name: <span id='name'>Sakamoto</span></div>"). In this case, as the number of words before a specification change and the number of words after a specification change, the variable element may be counted in (for example, in the case that the two tokens before and after the variable part are extracted as the peripheral character string, the peripheral information pieces of Sakamoto (1) after the specification change are "'id', 'name', 'Sakamoto', '/span', '/div'", which includes five words).

The information extraction apparatus 100 of the present embodiment is applicable not only to Web pages but also to structured documents. Further, the extraction method of a variable element is not limited to a difference calculation, and an arbitrary method may be used. Further, the calculation method of similarity is not limited to the example of the present embodiment, and an arbitrary method may be used.

In the above embodiment, the extraction unit 121 acquires through the communication unit 150 the HTML document corresponding to the URL having been input into the input unit 110. However, the acquiring method of an HTML document is not limited to this. For example, instead of inputting a URL, the communication unit 150 may receive an HTML document directly from a user. The received HTML document may be stored in the memory 140.

Note that although the information extraction apparatus 100 is realized by a single computer in the present embodiment, the function of the information extraction apparatus 100 may be realized by a plurality of devices. For example, the input unit 110 and the display unit 130 may be arranged in another mobile terminal. Further, the extraction unit 121, the storing unit 122, and the tracking unit 123 may be different components.

Second Embodiment

The information extraction apparatus of the present embodiment is configured to be able to extract only the information associated with a subject person, as a variable element which is a candidate for the extraction object. Specifically, the information extraction apparatus of the present embodiment excludes from variable elements a part which has changed in a short period of time (the short period of time is, for example, one minute, and the part is a current time in the present embodiment) in the document (a Web page, in the present embodiment) of a subject person. By excluding, as an exclusion element, an element (information such as a current time which is not associated with the subject person, in the case of the present embodiment) which is not desired to be extracted as a variable element, from the variable elements, the extraction process of peripheral information pieces and the calculation process of similarities (for example, step S204 of FIG. 2 and steps S503 to S506 of FIG. 5) can be performed in a shorter time, and only necessary information is provided as the variable elements to a user (step S205 of FIG. 2). In addition, the correspondence relation is more accurately restored on the basis of the similarity (step S506 of FIG. 5).

2-1. Configuration of Information Extraction Apparatus

The information extraction apparatus of the present embodiment has the same configuration as the information extraction apparatus of the first embodiment shown in FIG. 1.

2-2. Operation of Information Extraction Apparatus

FIG. 8 shows the HTML document corresponding to the URL of an extraction target Web page (the Web page of a subject person) before and after one minute has passed. In this example, the current time changes from "11:59" to "12:00". In the case of the first embodiment, after a plurality of Web pages are compared, and if the current time is different as a result of the comparison, the current time is extracted as a variable element. However, a current time is an element which changes as shown in FIG. 8 even if the subject person is the same. In the present embodiment, an element which changes even if the subject person is the same is excluded from the variable elements.

Figure 9:
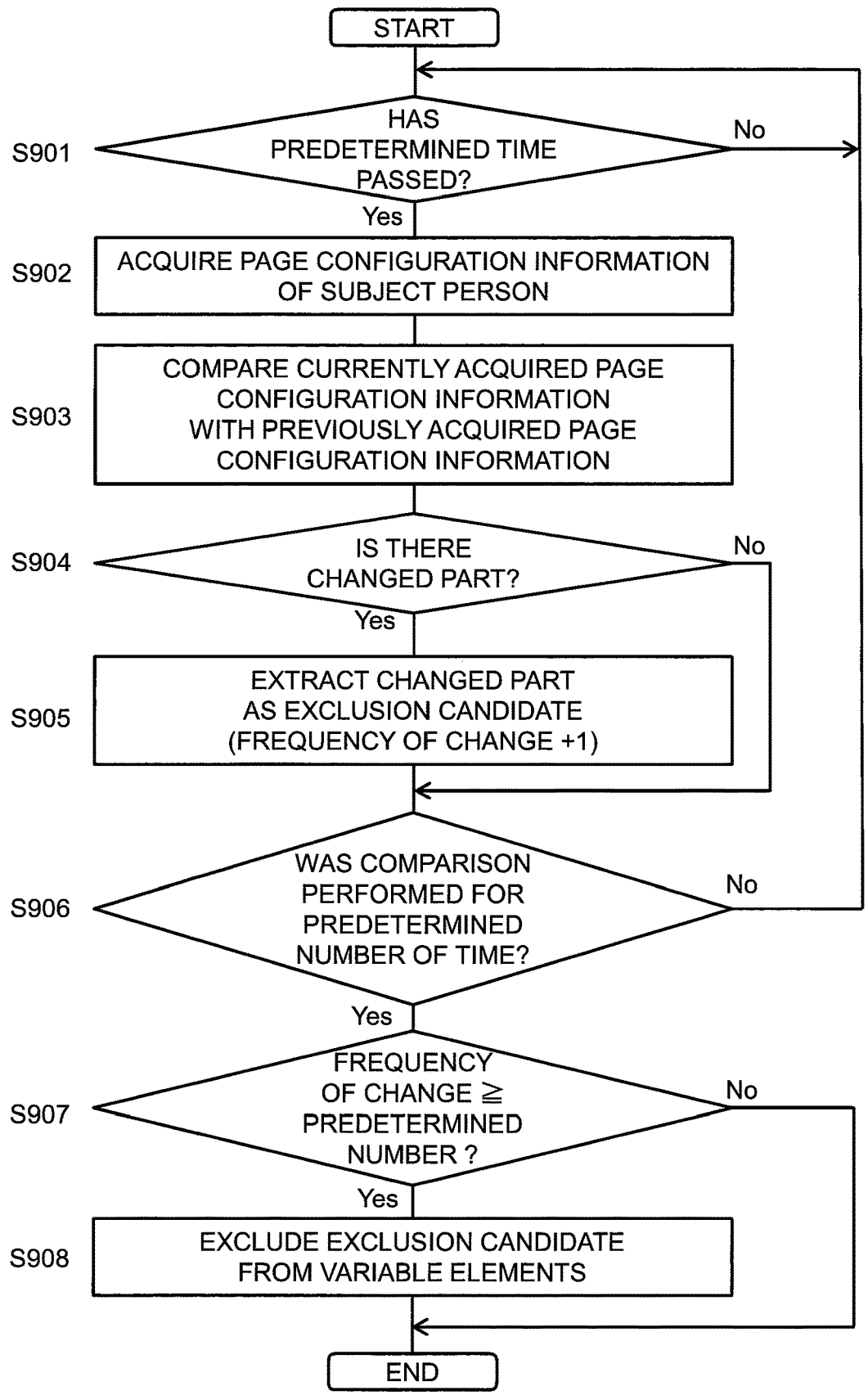
FIG. 9 is a flowchart illustrating how to extract and exclude an exclusion candidate in the second embodiment of the present disclosure.

FIG. 9 shows a flowchart of the extraction and exclusion of an exclusion candidate in the second embodiment of the present disclosure. The process of the extraction and exclusion of an exclusion candidate shown in FIG. 9 may be performed before the extraction of the variable elements (immediately before step S203 of FIG. 2) or may be performed after the extraction of the variable elements (immediately after step S203 of FIG. 2). Note that the process of the extraction and exclusion of an exclusion candidate shown in FIG. 9 may be performed at an arbitrary timing. However, the process is preferably performed before extracting the peripheral information pieces of the variable elements (before step S204 of FIG. 2). In the present embodiment, after the variable elements are extracted and before the peripheral information pieces of the variable elements are extracted (between step S203 and step S204 of FIG. 2), steps S901 to S908 shown in FIG. 9 are performed.

The extraction unit 121 of the information extraction apparatus 100 of the present embodiment sets a counter value representing a "frequency of change" to 0 and starts the process shown in FIG. 9. The extraction unit 121 acquires the page configuration information (the HTML document of a Web page) of a subject person at step S202 and then determines whether a predetermined time (for example, one minute) has passed (step S901). If the predetermined time has passed (step S901: Yes), the extraction unit 121 re-acquires the page configuration information corresponding to the URL of the subject person through the communication unit 150 (step S902). The extraction unit 121 compares the currently acquired page configuration information with the previously acquired page configuration information (step S903). Specifically, the difference between the currently acquired HTML document and the previously acquired HTML document is calculated. The extraction unit 121 determines, on the basis of the result of the comparison, whether there is a changed part (step S904), and if there is a changed part, the extraction unit 121 extracts the changed part as an exclusion candidate (step S905). Through the above process, the current time "11:59" and/or "12:00" shown in FIG. 8 are extracted, for example. Further, in step S905, the extraction unit 121 increases the counter value representing the "frequency of change" by one.

The extraction unit 121 determines whether the comparison of the page configuration information of the subject person (step S903) was performed for a predetermined number of times (for example, ten times) (step S906). If the comparison was not performed for the predetermined number of times (step S906: No), the flow goes back to step S901 to repeat the comparison process of the page configuration information of the subject person. If the comparison was performed for the predetermined number of times (step S906: Yes), the extraction unit 121 determines whether the counter value representing the frequency of change of the element extracted as the exclusion candidate is equal to or greater than the predetermined number (for example, nine times) (S907). If the counter value representing the frequency of change is equal to or greater than the predetermined number (step S907: Yes), the extraction unit 121 determines that the exclusion candidate is an exclusion element desired to be excluded from the variable elements and excludes the exclusion candidate from the variable elements (step S908). If the counter value representing the frequency of change is less than predetermined number (step S907: No), the extraction unit 121 does not exclude the exclusion candidate from the variable elements. By such a process, it is detected, for example, every one minute, whether the page configuration information of the subject person has changed, and if there is a part which changed nine times or more out of ten times, the changed part (the current time) is determined not to be a value depending on the subject person (instead, to be a value depending on time), and the part is excluded from the variable elements.

2-3. Conclusion

According to the present embodiment, by comparing the page configuration information of the subject person having been acquired for a plurality of times and excluding the changed part (the current time, in the present embodiment) from the variable elements, only the information (55 kg, 54 kg, 171 cm, and Sakamoto, in the present embodiment) associated with the subject person can be extracted as the variable elements.

In the process of restoring the correspondence relation on the basis of the similarity (step S506 of FIG. 5), if there are more candidates, the correspondence relation is more likely to be incorrectly restored. For example, if there are "body weight", "body height", and "atmospheric temperature" as the variable elements, there is a possibility that the numerical value of the "body weight" in the first acquired page is erroneously determined to have the correspondence relation to the numerical value of the "atmospheric temperature" in the newly acquired current page, and in that case, the information of the current body weight cannot be tracked. In the case that the calculation of the similarity cannot be successfully performed (for example, there are not enough amount of wordings in the periphery of the variable elements), if there are many types of variable elements, the restoration of the correspondence relation may be failed. Therefore, by excluding unnecessary exclusion elements from the variable elements in advance, the correspondence relation can be restored with a higher accuracy.

2-4. Modified Example

In step S903, the currently acquired page configuration information is compared with the previously acquired page configuration information (for example, the HTML documents each acquired at 12:00 and 11:59 are compared with each other, and the HTML documents each acquired at 12:01 and 12:00 are compared with each other). The initially acquired page configuration information (for example, the HTML document acquired at 11:59) may be compared with the newly acquired page configuration information (for example, the HTML documents acquired at 12:00, 12:01, 12:02, 12:03 . . . ).

Further, in the present embodiment, the context (that is, the decision criterion used at step S901) to be changed to extract the exclusion element is the acquisition time of the Web page. However, the context to be changed to extract the exclusion element may be arbitrarily set. For example, the extraction unit 121 may set the context, or alternatively, a user may set the context through the input unit 110. By considering what context the information desired to be extracted as a variable element is based on, it is possible to extract as a variable element the information which changes only when that context changes. For example, weather, an access source area, or the like may be set as the context to be changed to extract the exclusion element. With this setting, it is possible to exclude, from the variable elements, not only the current time but also, for example, information such as advertising banners which are not associated with individuals.

Further, in the present embodiment, the exclusion candidate is excluded from the variable elements when the page configuration information changes nine times or more out of ten times, where the predetermined time at step S901 is set to one minute, the predetermined number of times at step S906 is set to ten times, the predetermined number at step S907 is set to nine times and where the page configuration information of the subject person is compared every one minute. However, it is possible to arbitrarily set the predetermined time (decision criterion) at step S901, the predetermined number of times at step S906, and the predetermined number at step S907. For example, the extraction unit 121 may set them, or a user may set them through the input unit 110. Further, it may be possible to set the predetermined time (decision criterion) at step S901, the predetermined number of times at step S906, and the predetermined number at step S907, depending on the information desired to be extracted as a variable element and/or depending on the context to be changed to extract an exclusion element.

For example, because a body weight, a body height, and a name of an individual are less likely to change in every one minute, it is also possible to check every one minute whether the page configuration information of the subject person has changed and to determine the part, which changes three times out of three times, to be an exclusion element (current time). Alternatively, for example, in the case that the context to be changed to extract an exclusion element (advertising banner) is an "access source area", it is also possible to check, every time the access source area changes, whether the page configuration information of the subject person has changed, and to determine as an exclusion element a part which changes five times out of five times. Note that in order to prevent an erroneous decision, it is preferable to perform a plurality of comparisons, and as the comparison is performed more times, an erroneous decision can be more reliably prevented.

Further, other examples of excluding an exclusion element from the variable elements will be described. A description will be given to the case in which the information on a "notification count" in SNS services (such as Facebook and Twitter) is extracted and tracked. In SNS services, the content of the subject person's (his or her own) page changes when other users performs writing in or the like. Thus, there are a large number of variable elements in the subject person's page. Therefore, it is necessary to narrow down the variable elements as extraction objects. In this case, the Web page of the subject person is acquired before and after other users write in, and an exclusion element (the unnecessary variable element as the extraction object) is found out by comparing the difference between the acquired pages. Specifically, an account is prepared for an extraction method where the account is operated by a device, and the device account and the user who desires to perform extraction are brought into the state of friends who can share information. After that, the page is once stored before the device account writes in, and the page is stored again after the device account writes in. By calculating the difference between the pages before and after the device account writes in, the exclusion element (the unnecessary variable element as the extraction object) is excluded. Note that because a "notification count" which is the element not desired to be excluded can be increased while the device account is writing in, it is preferable to perform the trial for a sufficiently large number of times and set the necessary number of changes higher in order to prevent the "notification count" from being erroneously excluded. For example, under the setting of (the number of changes)/{the number of trials (access frequency)}=19/20, a part which changed 19 times out of 20 times may be excluded.

Next, a description will be given to the case in which the information on "today's weather" is desired to be excluded. For example, in order to exclude the information on the today's weather, it can be thought that the page is accessed every day to change the weather information. On the other hand, in the case that the "daily running distance" and the "today's weather" are posted on the same page, if the page is accessed every thy, the running distance is also changed. Therefore, the "running distance" and the "today's weather" are both determined to be an exclusion element. Therefore, on the basis of everyday access, it is impossible to exclude only the information on the "today's weather". In such a case, in order to exclude only the "today's weather", for example, the page is accessed for a plurality of times while changing the position information of the user so that only the information on the weather is changed to be the weather in Tokyo and the weather in Osaka, for example. As described above, the access frequency and the number of changes may set depending on the information to be extracted and on the information to be excluded. The frequency or the number of times is set to satisfy the condition that the desired information (variable element) does not change and the unnecessary information (exclusion element) changes. Such a setting makes it possible to more accurately extract only the unnecessary information as the exclusion element and to exclude the unnecessary information.

Note that instead of performing the extraction of the exclusion element (FIG. 9) in the second embodiment, the range in which the variable elements is extracted may be limited in the extraction of the variable elements in the first embodiment (step S203 of FIG. 2 and step S502 of FIG. 5). For example, the variable elements may be extracted only in the content of the BODY tag of the HTML document. Alternatively, the variable elements may be extracted only in the menu bar on the upper part of the Web page. As described above, it is also possible to narrow down an extraction range in which the variable elements are extracted instead of excluding the exclusion element from the variable elements. By narrowing down the extraction range, unnecessary information can be prevented from being extracted as a variable element. Further, the limitation of the extraction range of the variable elements may be performed along with performing the extraction of the exclusion element in the second embodiment (FIG. 9).

INDUSTRIAL APPLICABILITY

The information extraction apparatus of the present disclosure can continue to extract the specific information regardless of whether a specification of a structured document is changed or not, and thus the information extraction apparatus is useful for services in which specific information is extracted on a regular basis and in which the extracted specific information is used.

REFERENCE SIGNS LIST

100: Information extraction apparatus
110: Input unit

120: Controller
121: Extraction unit
122: Storing unit
123: Tracking unit
130: Display unit
140: Memory
141: Data base (DB)
150: Communication unit

The invention claimed is:

1. An information extraction apparatus comprising:
a controller configured to acquire a plurality of structured documents, each document having a first same specification and a different context, and extract, as variable elements, parts different between the acquired documents by calculating differences between a plurality of the structured documents, displaying a plurality of the extracted variable elements, and receiving a selection as an extraction object which is at least one of the variable elements selected by a user via a user interface device and extract, as peripheral information pieces, elements within a predetermined range from the respective variable elements extracted from each structured document; and
a storage unit configured to store the variable elements and the peripheral information pieces with respect to at least the extraction object,
wherein the controller
re-acquires a plurality of new structured documents, each new structured document having a second same specification and different context, where in the second same specification is different from the first same specification, and re-extracts, as variable elements, parts different between the new structured documents and re-extracts, as peripheral information pieces, elements within the predetermined range from the respective re-extracted variable elements,
calculates similarities of the variable elements and the peripheral information pieces between before and after the re-extraction, on the basis of (i) the re-extracted variable elements and the re-extracted peripheral information pieces and (ii) the variable elements and the peripheral information pieces stored in the storage unit, and
identifies, out of the re-extracted variable elements, a variable element corresponding to the extraction object, on the basis of the calculated similarities.

2. The information extraction apparatus according to claim 1, wherein a variable element having the highest similarity to the variable element as the extraction object is identified out of the re-extracted variable elements.

3. The information extraction apparatus according to claim 1, wherein
similarities between the re-extracted variable elements and the variable elements stored in the storage unit are calculated,
similarities between the re-extracted peripheral information pieces and the peripheral information pieces stored in the storage unit are calculated, and
variable elements on the basis of the similarities between the variable elements and on re-extracted variable elements on the basis of the similarities between the variable elements and on the basis of the similarities between the peripheral information pieces.

4. The information extraction apparatus according to claim 1, wherein
numeral parts and character parts contained in each of the re-extracted variable elements and the variable elements stored in the storage unit are separated into the numeral parts and the character parts, and
the similarities of the variable elements are determined on the basis of similarities between the numeral parts and similarities between the character parts.

5. The information extraction apparatus according to claim 1, further comprising:
a display unit configured to display the extracted variable elements; and
an input unit configured to input the extraction object selected by a user, out of the displayed variable elements.

6. The information extraction apparatus according to claim 1, wherein
a target document is acquired for a plurality of times, and
a part which differs, for a predetermined number of times, between the documents acquired for the plurality of times is excluded as an exclusion element from the variable elements.

7. An information extraction method comprising:
acquiring a plurality of structured documents having a same specification and a different context;
extracting, as variable elements, parts different between the acquired documents by calculating differences between a plurality of the structured documents;
displaying a plurality of the extracted variable elements;
receiving a selection as an extraction object which is at least one of the variable elements selected by a user via an input device extracted from each structured document;
extracting, as peripheral information pieces, elements within a predetermined range from the respective variable elements extracted from each structured document;
storing, in a storage unit, the variable elements and the peripheral information pieces with respect to at least the extraction object;
re-acquiring a plurality of new structured documents, each new structured document having a second same specification and different context, where in the second same specification is different from the first same specification;
re-extracting, as variable elements, parts different between the new structured documents;
re-extracting, as peripheral information pieces, elements within the predetermined range from the respective re-extracted variable elements;
calculating similarities of the variable elements and the peripheral information pieces between before and after the re-extraction, on the basis of (i) the re-extracted variable elements and the re-extracted peripheral information pieces and (ii) the variable elements and the peripheral information pieces stored in the storage unit, and
identifying, out of the re-extracted variable elements, a variable element corresponding to the extraction object, on the basis of the calculated similarities.

8. The information extraction method according to claim 7, wherein
a variable element having the highest similarity to the variable element as the extraction object is identified out of the re-extracted variable elements.

9. The information extraction method according to claim 7, wherein
similarities between the re-extracted variable elements and the variable elements stored in the storage unit are calculated, similarities between the re-extracted peripheral information pieces and the peripheral information pieces stored in the storage unit are calculated, and a variable element corresponding to the extraction object is identified out of the re-extracted variable elements on the basis of the similarities between the variable elements and on the similarities between the peripheral information pieces.

10. The information extraction method according to claim 7, wherein numeral parts and character parts contained in each of the re-extracted variable elements and the variable elements stored in the storage unit are separated into the numeral parts and the character parts, and the similarities of the variable elements are determined on the basis of similarities between the numeral parts and similarities between the character parts.

11. The information extraction method according to claim 7, further comprising:

displaying the extracted variable elements; and inputting the extraction object selected by a user, out of the displayed variable elements.

12. The information extraction method according to claim 7, wherein a target document is acquired for a plurality of times, and a part which differs, for a predetermined number of times, between the documents acquired for the plurality of times is excluded as an exclusion element from the variable elements.

13. A non-transitory computer readable medium including a program for causing a computer to execute the steps of:

acquiring a plurality of structured documents having a same specification and a different context;

extracting, as variable elements, parts different between the acquired documents by calculating differences between a plurality of the structured documents;

displaying a plurality of the extracted variable elements;

receiving a selection as an extraction object which is at least one of the variable elements selected by a user via an input device extracted from each structured document;

extracting, as peripheral information pieces, elements within a predetermined range from the respective variable elements extracted from each structured document;

storing, in a storage unit, the variable elements and the peripheral information pieces with respect to at least the extraction object;

re-acquiring a plurality of new structured documents, each new structured document having a second same specification and different context, where in the second same specification is different from the first same specification;

re-extracting, as variable elements, parts different between the new structured documents;

re-extracting, as peripheral information pieces, elements within the predetermined range from the respective re-extracted variable elements;

calculating similarities of the variable elements and the peripheral information pieces between before and after the re-extraction, on the basis of (i) the re-extracted variable elements and the re-extracted peripheral information pieces and (ii) the variable elements and the peripheral information pieces stored in the storage unit, and identifying, out of the re-extracted variable elements, a variable element corresponding to the extraction object, on the basis of the calculated similarities.

\* \* \* \* \*